May 10, 1932.  I. F. KINNARD ET AL  1,857,196
TEMPERATURE INDICATING INSTRUMENT
Filed Dec. 19, 1929
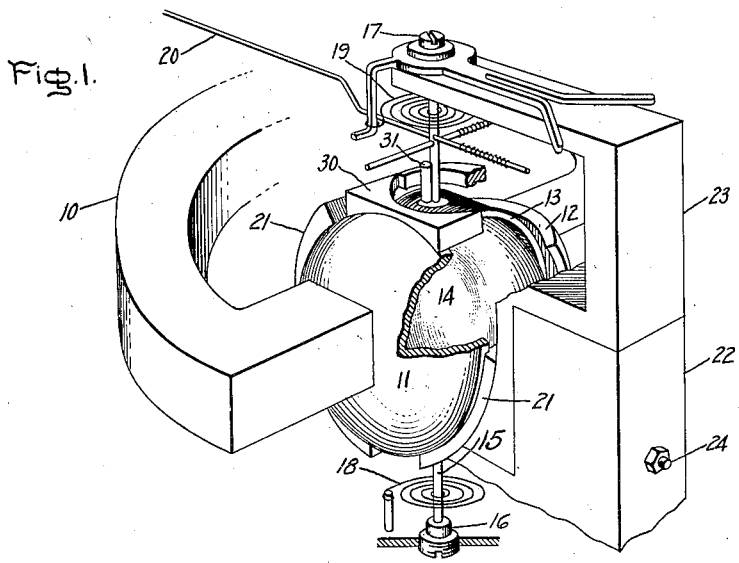
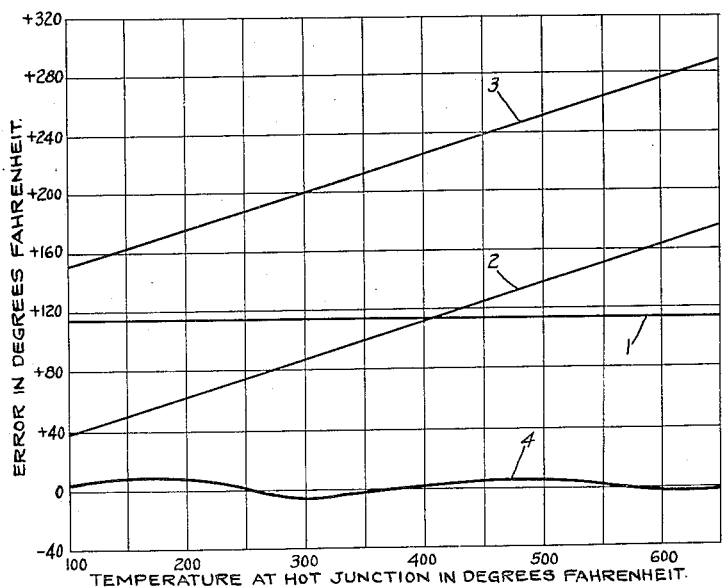
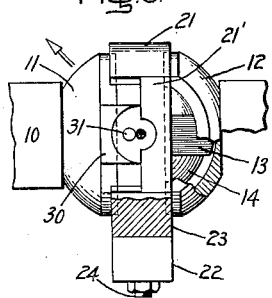
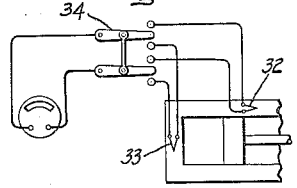
Inventors:
Isaac F. Kinnard,
Harold T. Faus,
by Charles E. Tullar
His Attorney.

Patented May 10, 1932

1,857,196

UNITED STATES PATENT OFFICE

ISAAC F. KINNARD, OF LYNNFIELD, AND HAROLD T. FAUS, OF LYNN, MASSACHUSETTS, ASSIGNORS TO GENERAL ELECTRIC COMPANY, A CORPORATION OF NEW YORK

TEMPERATURE INDICATING INSTRUMENT

Application filed December 19, 1929. Serial No. 415,339.

Our invention relates to electrical measuring instruments and in particular to such instruments employed in connection with thermocouples for measuring temperatures. The object of the present invention is to provide an instrument which is compensated for changes in temperature at the instrument over very wide ranges.

In the aeroplane industry it is essential that there be provided on the instrument board a small rugged instrument for indicating the temperature of various parts of the engine with a fair degree of accuracy. Such an instrument should be capable of indicating engine temperatures over a range from 100 to 650 degrees Fahrenheit for example. The instrument itself may be subjected to a temperature variation from +100 to −40 degrees F. under different conditions. It is known that indicating instruments which are connected to thermo-couples give accurate temperature indications only when the instrument itself is held at a given temperature for which it is calibrated or else is compensated for changes in the cold junction temperature of the thermocouple and for changes in the resistance of its winding.

Our invention may be embodied in temperature indicating instruments to compensate for these errors over wide temperature variations such as are met with in the aeroplane industry and although the invention is not limited to this particular application it may be stated that we have successfully demonstrated our invention for such use and the embodiment hereinafter described is particularly suited for such application.

The features of our invention which are believed to be novel and patentable will be pointed out in the claims appended hereto. For a better understanding of the invention reference is made in the following description to the accompanying drawings in which we have shown in Fig. 1 a perspective view partially in section of an electric measuring instrument to which our invention has been applied; Fig. 2 are curves showing errors that may be expected in uncompensated instruments under different conditions as compared to a compensated instrument. Fig. 3 is a top view of the compensating features of the instrument shown in Fig. 1 and Fig. 4 illustrates the instrument installed for connection to different thermocouples.

In Fig. 1 we have shown an electric measuring instrument which except for the temperature compensating features is of a well known construction. The instrument has a permanent magnet 10 provided with spherical pole tips 11 and 12. A moving coil armature 13 surrounds an inner stationary spherical core 14. The armature coil is mounted on a shaft 15 pivoted in bearings 16 and 17. Spirals 18 and 19 serve as leads to the coil 13 in order that the instrument may be connected to a thermocouple as indicated in Fig. 4. The spirals may also serve as return springs for the instrument. The pointer is shown at 20. The part indicated at 21 is a non-magnetic shell or spacer and may be made of brass or other non-magnetic material, as may also the supporting parts 22 and 23. The part 21 is held between the pole pieces by so fitting that when the pole pieces are sprung apart slightly and the part 21 inserted it is clamped tight. A bolt 24 passing through part 21, core 14, parts 22 and 23, serves to hold these parts firmly together. The instrument as thus far described is of a well known construction and requires compensation to correct for temperature errors the nature of which will now be explained.

It is known that the electromotive force generated by a thermocouple is proportional to the difference in temperature between the hot and cold junctions of the couple. When, as is usually the case, the thermocouple is connected to a sensitive measuring instrument and the cold junction is made at the instrument, the instrument must be held at a given temperature for which it is calibrated or else it must be compensated for changes in cold junction temperature if the instrument is to correctly indicate the temperature at the hot junction or couple. If it is uncompensated for cold junction temperature changes, the resulting error will be proportional to the difference between the cold junction temperature and the temperature at which the instrument was calibrated and the error due to this cause will be the same for all points on the instrument scale. This may be explained in connection with Fig. 2. In this figure the abscissa represents temperatures at the hot junction of the thermocouple in degrees Fahrenheit and the ordinates represent positive errors in degrees Fahrenheit of the instrument reading. If we calibrate an uncompensated instrument at 75 degrees Fahrenheit for example and take temperature readings with a cold junction temperature of −40 F., the instrument will read too high by the same amount at all parts of the scale. That is, the error due to the change in cold junction is a constant angular error. We may plot such error as in curve 1.

There is another type of temperature error that requires consideration which is the error caused by the change in resistance of the instrument armature winding with changes in temperature. At 75 degrees Fahrenheit the instrument coil has a given resistance, at −40 degrees F. it has a lower resistance and hence will take more current and give a greater deflection. This error however is a percentage error and varies with the instrument deflection, which error we may plot by curve 2. The resultant error of an uncompensated thermocouple instrument will be the sum of curves 1 and 2, or curve 3. By means of our invention we may compensate the instrument for this resultant error as will now be described.

At the upper portion of the instument the non-magnetic spacing ring 21 is cut away except for the narrow portion 21' at one side of the shaft, which portion is present for mechanical reasons only and has nothing in particular to do with the temperature compensation. At the upper portion of one of the spherical pole tips 11 there is an auxiliary stationary compensating pole piece 30 made out of iron or other satisfactory magnetic material. On the armature member and eccentric with respect to its axis of rotation but parallel to the axis is a small auxiliary vane 31, positioned adjacent to the pole piece 30. This vane is made from a material the magnetic permeability of which decreases as the temperature increases over such temperature variation range as the instrument itself will be subjected, for example from −40 to 105 degrees Fahrenheit. There are various materials which possess this characteristic to a greater or less degree. Certain nickel-steel alloys may serve the purpose within certain temperature limits. A material which we have employed with satisfactory results is an alloy of copper, nickel and iron. For the temperature range specified above we have used such an alloy with the following composition: Copper, about 30%, nickel, about 66.5% and iron about 2.2%, such material being treated in accordance with the teachings of Kinnard Patent 1,706,172, March 19, 1929. This material has negligible hysteresis, which is desirable, and has a substantially uniform negative temperature coefficient of permeability over the temperature range previously mentioned.

It will be evident that by properly proportioning the parts a portion of the flux of the permanent magnet 10 will be shunted through the auxiliary pole piece 30 across the air gap between this pole piece to the vane 31 and then downward into the iron core 14. The top of spherical pole piece 12 is cut off so that the shunted flux will follow the path just specified and so that pole piece 12 will not exert an attraction which will oppose the attraction between the auxiliary pole piece 30 and the vane 31. It will also be apparent that the amount of flux thus shunted from the normal armature path through the compensating path will increase and decrease as the temperature decreases and increases. The amount of flux thus shunted at any given temperature and armature deflection may be adjusted by raising or lowering the armature slightly with respect to the stationary magnetic circuit since this varies the distance between the lower end of the vane 31 and the iron core 14. For this purpose the bearings 16 and 17 are made adjustable in a vertical direction as indicated. The auxiliary iron pole piece 30 is held in place between a shoulder on pole piece 11 and the non-magnetic part 21' as best shown in Fig. 3 which represents the position of the vane 31 at approximately zero scale reading. Pole 30 may be adjusted up and down as viewed in Fig. 3 so as to vary the air gap relation between its curved face and the vane 31 as the armature is turned. In the position shown in Fig. 3 the air gap will remain about the same as the instrument pointer moves up scale. If we adjust pole piece 30 so that the restoring torque produced between it and vane 31 remains constant at all deflections, assuming constant temperature, we will have a compensating component of the character required to correct for the cold junction temperature error curve 1, Fig. 2. This we may readily change to either increase or decrease with instrument deflection by moving the pole piece 30 down or up as viewed in Fig. 3. This restoring torque acts in the same direction and assists the zero restoring torque of the control springs.

That portion of the flux which passes through the compensating shunt circuit passes through only one side of the armature and this reduces the resultant armature torque. Such reduction in torque is proportional to the flux shunted or inversely proportional to the temperature. This in itself gives us a compensating component of the character required to correct for the change in resistance of the armature winding or to correct for an error of the character represented in curve 2, Fig. 2.

The character of the resultant compensation may be varied and controlled by adjusting the position of the pole piece 30 and by raising and lowering the armature until it corrects for the resultant error of the instrument curve 3, Fig. 2.

The relation of parts which we have represented in the drawings are about correct for a copper coil instrument when used over the temperature range indicated above. The armature has about a 90 degree deflection from zero to full scale. Curve 4, Fig. 2 represents the accuracy of an instrument equipped with our invention when tested at −40 degrees Fahrenheit after being calibrated accurately at +75 degrees Fahrenheit and which without compensation would have an error of the magnitude represented in curve 3 at −40 degrees Fahrenheit. This makes a rugged compact accurate instrument having compensation over a very wide range of temperature such that it may be used at any temperature liable to be met with in aircraft experience to accurately indicate temperatures at different parts of the engine. We have built such instruments to go into cylindrical casings of about 3 inches diameter and 1½ inches in depth, particularly suited for mounting on aeroplane instrument boards.

Such an instrument also has a considerable advantage over one which is correctly compensated at only one part of the scale reading since it gives correct indications at all parts of the scale and may therefore be used to indicate the temperature of parts which differ considerably in temperature. For example, the cylinder walls of the engine may be equipped with a thermocouple as indicated at 32, Fig. 4, to ascertain temperature up to about 300 degrees Fahrenheit and the engine head may be equipped with a thermocouple 33 to ascertain temperature up to about 600 degrees Fahrenheit. Both such thermocouples may be alternately connected to our compensated instrument by a tranfer switch 34 with the assurance that the instrument will accurately indicate over both such temperature ranges. That is, the accuracy of the instrument is not confined to a limited hot junction temperature range or to a limited cold junction temperature range, but gives accurate results over its entire scale at all ambient temperatures.

The invention is of course not confined to the particular application referred to above. The method of compensation for variations in cold junction temperature by varying the zero restoring torque with temperature changes might be used alone in connection with an instrument which was compensated for changes in armature resistance by some other method than the one here described. For example, the instrument might be compensated for changes in armature resistance by including in series with it a resistance having such temperature coefficient of resistance as to offset the variations in resistance of the armature winding. The principle of employing a temperature responsive magnetic vane to control the deflection of an instrument at different points of the scale might also be used to counteract variations in the strength of the control springs with changes in temperature. In the embodiment illustrated the instrument is of course calibrated so as to compensate for all of the temperature errors that may exist in the instrument and it is probable that a limited amount of control spring compensation is included in the total.

In accordance with the provisions of the patent statutes we have described the principle of operation of our invention, together with the apparatus which we now consider to represent the best embodiment thereof but we desire to have it understood that the apparatus shown and described is only illustrative and that the invention may be carried out by other means.

What we claim as new and desire to secure by Letters Patent of the United States is:

1. An electric measuring instrument comprising a stationary magnet provided with an air gap, a movable armature member in such air gap influenced by the flux of said magnet crossing such gap, temperature compensating means comprising a magnetic vane on the armature member and an auxiliary pole piece on said stationary magnet with which said vane cooperates to furnish a magnetic zero restoring torque for said instrument, one of the elements of such zero restoring torque means having a negative temperature coefficient of permeability such that the restoring torque thus furnished varies with temperature changes.

2. An electric measuring instrument comprising a movable armature member, a stationary magnet for producing a flux through said armature member, temperature compensating means comprising a magnetic vane movable with said armature and influenced by the flux of said magnet to furnish a zero restoring torque for said instrument, said vane having a negative temperature coefficient of permeability such that the restoring torque thus furnished decreases with an increase in temperature.

3. An electric measuring instrument comprising a permanent magnet provided with an air gap, a moving coil armature member in such air gap, temperature compensating means comprising a magnetic vane having a negative temperature coefficient of permeability mounted on the armature member, an auxiliary pole piece cooperating with said vane, said vane and auxiliary pole piece serving to shunt a portion of the permanent magnet flux from its normal path through the armature, the magnitude of the shunted flux varying with temperature changes.

4. An electric measuring instrument comprising a stationary magnet and a movable armature influenced by flux from said magnet, magnetic means for furnishing a zero restoring torque for said instrument the value of which decreases with an increase in temperature, and means for adjusting the value of such torque at a given temperature.

5. An electric measuring instrument comprising a stationary maget and a movable armature influenced by flux from said magnet, magnetic means for furnishing a zero restoring torque for said instrument, the value of which decreases with an increase in temperature, and means for adjusting the relative value of such torque at different deflections of said armature at a given temperature.

6. An electric measuring instrument comprising a stationary magnet provided with pole pieces separated by an air gap, a moving coil armature in said air gap, a stationary core piece within said armature coil in said air gap, a magnetic vane outside of but movable with the armature coil and an auxiliary pole piece on said magnet for diverting a portion of the flux of said magnet around one side of said armature and into the stationary core piece near the axis of rotation of the coil, said parts being arranged to furnish a zero restoring torque for the instrument, said vane having a negative temperature coefficient of permeability whereby such torque decreases with an increase in temperature.

7. An electric measuring instrument comprising a permanent magnet provided with pole pieces separated by an air gap, a moving coil armature in said gap pivoted on an axis of rotation at approximately right angles to the normal path of the flux from the magnet through the armature coil, an auxiliary pole piece on the magnet and a magnetic vane movable with the armature for diverting a portion of the permanent magnet flux from its normal path across the air gap and causing it to enter the armature coil near its axis of rotation thereby rendering such diverted flux ineffective for producing armature torque as it enters the armature, the magnetic vane and auxiliary pole piece being arranged to furnish a magnetic zero restoring torque for the instrument due to passage of the diverted flux between them, the vane having a negative temperature coefficient of permeability whereby the restoring torque decreases and the effective armature flux increases with an increase in temperature.

8. In combination, an electric measuring instrument, a thermocouple electrically connected with said instrument, said thermocouple having its hot end junction remote from the instrument and its cold end coupling at the instrument, said instrument being calibrated to indicate the temperature at the hot junction, and common means in said instrument for compensating for variations in temperature at the cold end coupling of such thermocouple and for temperature errors in said instrument.

9. In combination, an electric measuring instrument of the permanent magnet, moving coil type, a thermocouple, means for connecting the coil of said instrument to said thermocouple, said thermocouple having its hot junction remote from the instrument and its cold coupling at the instrument, said instrument being calibrated to indicate the temperature at the hot junction of the thermocouple, and common means in said instrument for compensating the instrument for variations in armature resistance at different temperature and for changes in the cold end coupling temperature of said thermocouple.

10. Temperature measuring apparatus comprising an electric measuring instrument, a thermocouple electrically connected thereto, said thermocouple having its hot end junction remote from the instrument and its cold end coupling at the instrument, said instrument being calibrated at a given temperature to indicate the temperature at the hot junction of said thermocouple, and means for compensating said apparatus for changes in the cold end coupling temperature, comprising magnetic means in said instrument for furnishing a zero restoring torque which varies inversely with temperature changes.

In witness whereof, we have hereunto set our hands this sixteenth day of December, 1929.

ISAAC F. KINNARD.
HAROLD T. FAUS.